(12) United States Patent
Jiang et al.

(10) Patent No.: US 9,794,657 B1
(45) Date of Patent: Oct. 17, 2017

(54) SYSTEM AND METHOD FOR OPTICAL SWITCHING

(71) Applicants: Zhiping Jiang, Kanata (CA); Zhuhong Zhang, Ottawa (CA)

(72) Inventors: Zhiping Jiang, Kanata (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/171,238

(22) Filed: Jun. 2, 2016

(51) Int. Cl.
*H04L 27/26* (2006.01)
*H04Q 11/00* (2006.01)
*H04J 14/02* (2006.01)

(52) U.S. Cl.
CPC ...... *H04Q 11/0062* (2013.01); *H04J 14/0212* (2013.01); *H04Q 11/0005* (2013.01); *H04Q 2011/0015* (2013.01); *H04Q 2011/0016* (2013.01); *H04Q 2011/0073* (2013.01); *H04Q 2011/0086* (2013.01)

(58) Field of Classification Search
CPC ........... H04Q 11/0062; H04Q 11/0005; H04Q 2011/0015; H04Q 2011/0016; H04Q 2011/0073; H04Q 2011/0086
USPC ............................................. 398/48, 4, 493
See application file for complete search history.

(56) References Cited

U.S. PATENT DOCUMENTS

| | | | | |
|---|---|---|---|---|
| 6,980,736 B1 * | 12/2005 | Fee | ................ | H04Q 11/0005 398/12 |
| 2002/0018263 A1 * | 2/2002 | Ge | .................. | H04L 49/106 398/87 |
| 2003/0185565 A1 * | 10/2003 | Wang | ............... | H04J 14/0212 398/49 |
| 2004/0151497 A1 * | 8/2004 | Lee | .................. | H04Q 11/0005 398/45 |
| 2004/0223762 A1 * | 11/2004 | Lee | .................. | H04Q 11/0005 398/51 |
| 2005/0089027 A1 * | 4/2005 | Colton | ............... | H04Q 11/0005 370/380 |
| 2005/0180750 A1 | 8/2005 | Wada et al. | | |

(Continued)

FOREIGN PATENT DOCUMENTS

| | | |
|---|---|---|
| CN | 101370315 A | 2/2009 |
| CN | 102427567 A | 4/2012 |
| CN | 203014816 U | 6/2013 |

OTHER PUBLICATIONS

Sato, Ken-Ichi et al., "A Large-Scale Wavelength Routing Optical Switch for Data Center Networks" Optical Technologies For Data Center Networks, IEEE Communications Magazine, Sep. 2013, pp. 46-52.

*Primary Examiner* — Oommen Jacob

(57) ABSTRACT

As network traffic grows and more data needs to be transmitted through a network, it is desired to use optical switching systems that allow for switching between a large number of nodes. An optical switching system according to one embodiment disclosed herein allows different nodes to transmit optical signals having the same optical wavelength, in order to accommodate a larger number of nodes. For example, one cluster of nodes may transmit data using optical wavelengths that are the same as optical wavelengths that may also be used by other clusters of nodes. A controller performs scheduling and reconfiguration in the optical switching system, as needed, e.g. in order to mitigate collisions.

21 Claims, 12 Drawing Sheets

(56) References Cited

U.S. PATENT DOCUMENTS

| | | | | |
|---|---|---|---|---|
| 2009/0238574 A1* | 9/2009 | Sone | ............... | H04Q 11/0005 398/139 |
| 2009/0252493 A1* | 10/2009 | Xu | ............... | H04J 14/0227 398/53 |
| 2010/0014863 A1* | 1/2010 | Zami | ............... | H04J 14/0204 398/79 |
| 2014/0029944 A1* | 1/2014 | Sato | ............... | H04Q 11/0005 398/50 |
| 2014/0056371 A1* | 2/2014 | Ji | ............... | H04L 27/2697 375/260 |
| 2014/0112661 A1* | 4/2014 | Sakane | ............... | H04J 14/02 398/38 |
| 2015/0326955 A1* | 11/2015 | Lord | ............... | H04J 14/0217 398/49 |
| 2016/0127810 A1* | 5/2016 | Lea | ............... | H04Q 11/0005 398/51 |

* cited by examiner

SYSTEM AND METHOD FOR OPTICAL SWITCHING

FIELD

The present application relates to optical switching.

BACKGROUND

When data is transmitted through a network, the data often has to travel through switches. For example, a data center may have several nodes coupled to each other through one or more switches. The nodes may be servers. Data at a first node may need to be transmitted to a second node via the switches.

Traditionally, electronic switches have been used to perform the switching. However, optical switching systems are now replacing electronic switches in some applications. An optical switching system uses optical signals to carry data between nodes. For example, data at a first node may be converted from the electrical domain into an optical signal, and then the optical signal may be transmitted through the optical switching system to the second node. At the second node, the optical signal may then be converted back to data in the electrical domain.

As network traffic grows and more data needs to be transmitted through a network, it is desired to use optical switching systems that allow for switching between a large number of nodes.

SUMMARY

Optical switching systems and related methods are disclosed. An optical switching system according to one embodiment allows different nodes to transmit optical signals having the same optical wavelength, in order to accommodate a larger number of nodes. For example, one cluster of nodes may transmit data using optical wavelengths that are the same as optical wavelengths that may also be used by other clusters of nodes. A controller performs scheduling and reconfiguration in the optical switching system, as needed, e.g. in order to mitigate collisions.

In one embodiment, an optical switching system for switching data between a plurality of nodes is provided. The optical switching system may include a plurality of optical couplers. Each one of the optical couplers may have an output and a plurality of inputs. Each input of the plurality of inputs is for optical connection to a respective one of the plurality of nodes. The optical switching system may further include a plurality of wavelength demultiplexers. Each one of the wavelength demultiplexers may have an input and a plurality of outputs. Each output of the plurality of outputs is also for optical connection to a respective one of the plurality of nodes. An optical routing matrix may be interposed between the optical couplers and the wavelength demulitplexers, and the optical routing matrix may transmit optical signals between the optical couplers and the wavelength demulitplexers. The optical routing matrix may have a plurality of inputs and a plurality of outputs. Each input of the optical routing matrix may be optically connected to the output of a respective one of the optical couplers. Each output of the optical routing matrix may be optically connected to the input of a respective one of the wavelength demultiplexers.

The optical switching system may further include a controller. The controller may configure the optical routing matrix to set, for each optical wavelength arriving at each input of the optical routing matrix, a corresponding output of the optical routing matrix to which the optical wavelength is transmitted. The controller may further transmit an instruction to a first node of the plurality of nodes that, when executed by the first node, causes the first node to transmit data during a time slot. The data may be destined for a second node of the plurality of nodes, and the data is transmitted to the optical coupler to which the first node is optically connected. The data may be transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers.

A controller and corresponding method performed by the controller is also disclosed.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
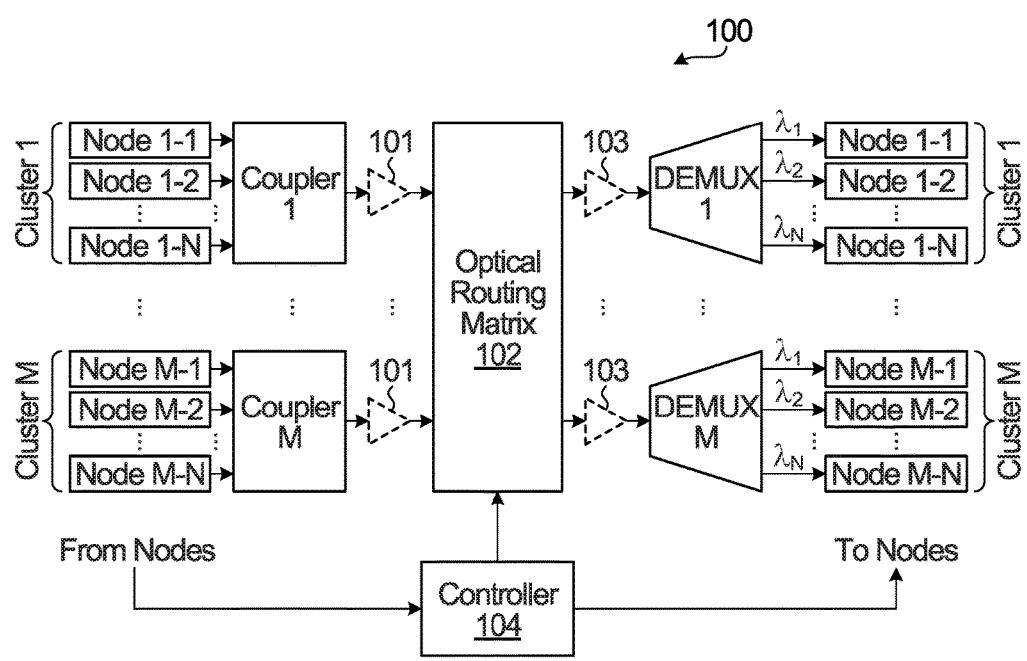
FIG. 1 is a block diagram of an optical switching system, according to one embodiment.

FIG. 1 is a block diagram of an optical switching system 100, according to one embodiment. The optical switching system 100 is for switching data between K nodes, where K=M×N. The nodes are labelled node 1-1, node 1-2, . . . , node 1-N, . . . , node M-1, node M-2, . . . , node M-N. Each node is shown twice in FIG. 1 for clarity. On the left side of the optical switching system 100, the transmitting portion of each of the nodes is illustrated. On the right side of the optical switching system 100, the receiving portion of each of the nodes is illustrated. Any one of the nodes may transmit data through the optical switching system 100 to any other one of the nodes.

Each set of N nodes is grouped into a respective cluster. There are M clusters, labelled cluster 1 to cluster M. Although the same number of nodes is shown in each cluster, there may be a different number of nodes in each cluster. Each node in each cluster can transmit data at any one of N optical wavelengths $\lambda_1$ to $\lambda_N$. The wavelength used by each node in each cluster may change over time, but as discussed in more detail below, for any given time slot only one node in each cluster may use a particular one of the N wavelengths. The output of each cluster is connected to an optical coupler. There are M optical couplers, labelled 1 to M in FIG. 1. Each optical coupler combines N input optical signals into a single output optical signal. Therefore, the single output optical signal includes the wavelengths of each of the N input optical signals. Each optical coupler may be a passive optical device.

Each optical coupler is connected to an optical routing matrix 102. The optical routing matrix 102 has M inputs and M outputs. The optical routing matrix 102 routes each optical wavelength arriving at each input of the optical routing matrix 102 to one of the M outputs of the optical routing matrix 102. The optical routing matrix 102 may be a passive optical device. Each one of the M outputs of the optical routing matrix 102 is connected to a respective wavelength demultiplexer. There are M wavelength demultiplexers, labelled 1 to M, and each wavelength demultiplexer corresponds to a respective cluster. Each wavelength demultiplexer performs wavelength-division-multiplexing (WDM) demultiplexing to separate the received optical signal based on wavelength. The output of each wavelength demultiplexer is therefore a plurality of optical signals, each one at a respective wavelength. The optical signal input to each wavelength demultiplexer may have a maximum of N wavelengths ($\lambda_1$ to $\lambda_N$), and so each demultiplexer has N outputs. Each one of the N outputs corresponds to a respective optical signal of wavelength $\lambda_k$, where k=1, 2, . . . N. Each wavelength demultiplexer may be a passive optical device. Each output of each wavelength demultiplexer is connected to the input of a respective node.

The optical switching system 100 further includes a controller 104. As explained in more detail below, the controller 104 performs centralized control. For example, the controller 104 coordinates transmission wavelength and timeslot assignment for the nodes, the controller 104 performs timeslot synchronization, and the controller 104 configures and reconfigures the optical routing matrix 102 to allow different nodes to communicate with each other.

In some embodiments, an amplifier 101 may be interposed between each optical coupler and each input of the optical routing matrix 102. The amplifier 101 compensates for power loss when the optical signals are combined in the optical coupler. Similarly, an amplifier 103 may be interposed between each output of the optical routing matrix 102 and each wavelength demultiplexer. The amplifiers 101 and 103 may be Erbium-doped fiber amplifiers (EDFAs) or semiconductor optical amplifiers (SOAs). The amplifiers 101 and 103 are illustrated using stippled lines to show that they are optional. In the embodiments illustrated in the other figures, the amplifiers have been omitted for clarity. However, the amplifiers 101 and 103 may be present in actual implementation.

To further explain the details of the optical switching system 100 and its operation, a specific example will be used in which N=M=4. However, it will be appreciated that the explanation below equally applies to other values of N and M.

Figure 2:
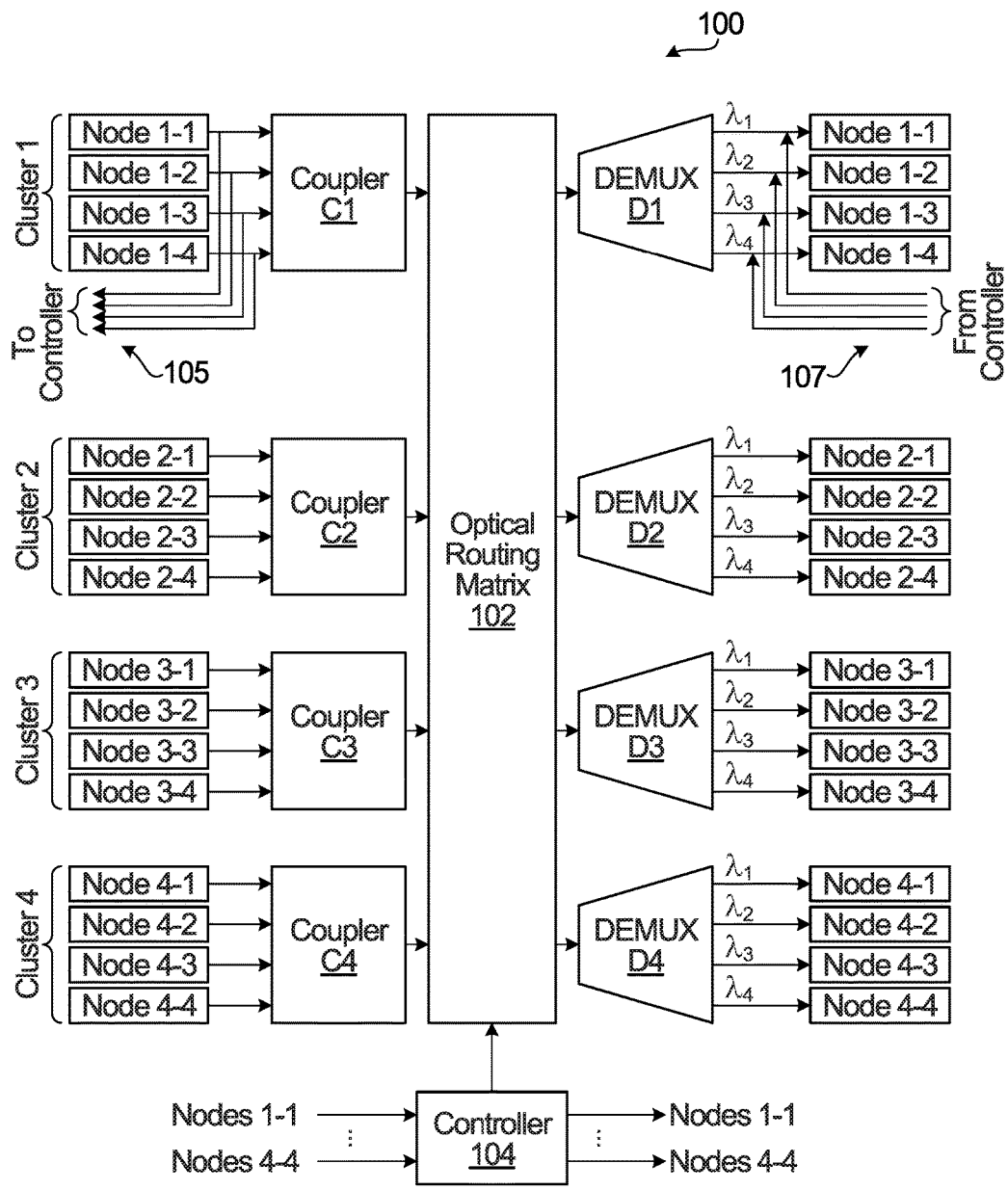
FIG. 2 is the system of FIG. 1 for the case in which N=M=4.

FIG. 2 is the optical switching system 100 of FIG. 1 for the case in which N=M=4. The four optical couplers are respectively labelled C1, C2, C3, and C4, and the four wavelength demultiplexers are respectively labelled D1, D2, D3, and D4. During operation, each one of nodes 1-1 to 4-4 has data that is to be transmitted to other ones of the nodes. However, each one of the nodes can only receive data transmitted at a particular optical wavelength. Specifically, node 1-1 is connected to the output of wavelength demultiplexer D1 that corresponds to optical wavelength $\lambda_1$, and therefore node 1-1 can only receive data transmitted using an optical signal of wavelength $\lambda_1$. If another node is to transmit data to node 1-1, then that other node needs to transmit the data using an optical signal of wavelength $\lambda_1$. Similarly, node 1-2 can only receive data transmitted using an optical signal of wavelength $\lambda_2$, node 1-3 can only receive data transmitted using an optical signal of wavelength $\lambda_3$, and so on.

Wavelengths $\lambda_1$ to $\lambda_4$ are reused by each cluster of nodes. Therefore, and as an example, when node 1-1 transmits data on wavelength $\lambda_2$, that data may possibly be received by node 1-2, node 2-2, node 3-2, or node 4-2. The controller 104 configures the optical routing matrix 102 to ensure that the input optical signals from the optical couplers C1 to C4 are routed to the appropriate wavelength demultiplexers D1 to D4 so that the data from each of the nodes 1-1 to 4-4 is transmitted to the correct recipient.

The controller 104 receives optical signals carrying control information from each one of the nodes 1-1 to 4-4. The control information specifies the amount of data at each one of the nodes that is to be transmitted to each other of the nodes. The control signals from nodes 1-1 to 1-4 are illustrated at 105 in FIG. 2. Similar control signals exists for the other nodes, but have been omitted from FIG. 2 for the sake of clarity. The controller 104 also transmits optical signals to each of the nodes carrying control information relating to scheduling and time synchronization, as described in more detail below. The control signals for nodes 1-1 to 1-4 are illustrated at 107 in FIG. 2. Similar control signals exists for the other nodes, but have been omitted from FIG. 2 for the sake of clarity. An example of how the optical signals carrying the control information may be multiplexed with/demultiplexed from the optical data signals is described later in relation to FIG. 4. The control signals 105 and 107 form a bidirectional control channel, which may be out-of-band (OOB). The control channel may operate in continuous mode, rather than in a burst/slot mode.

Figure 3:
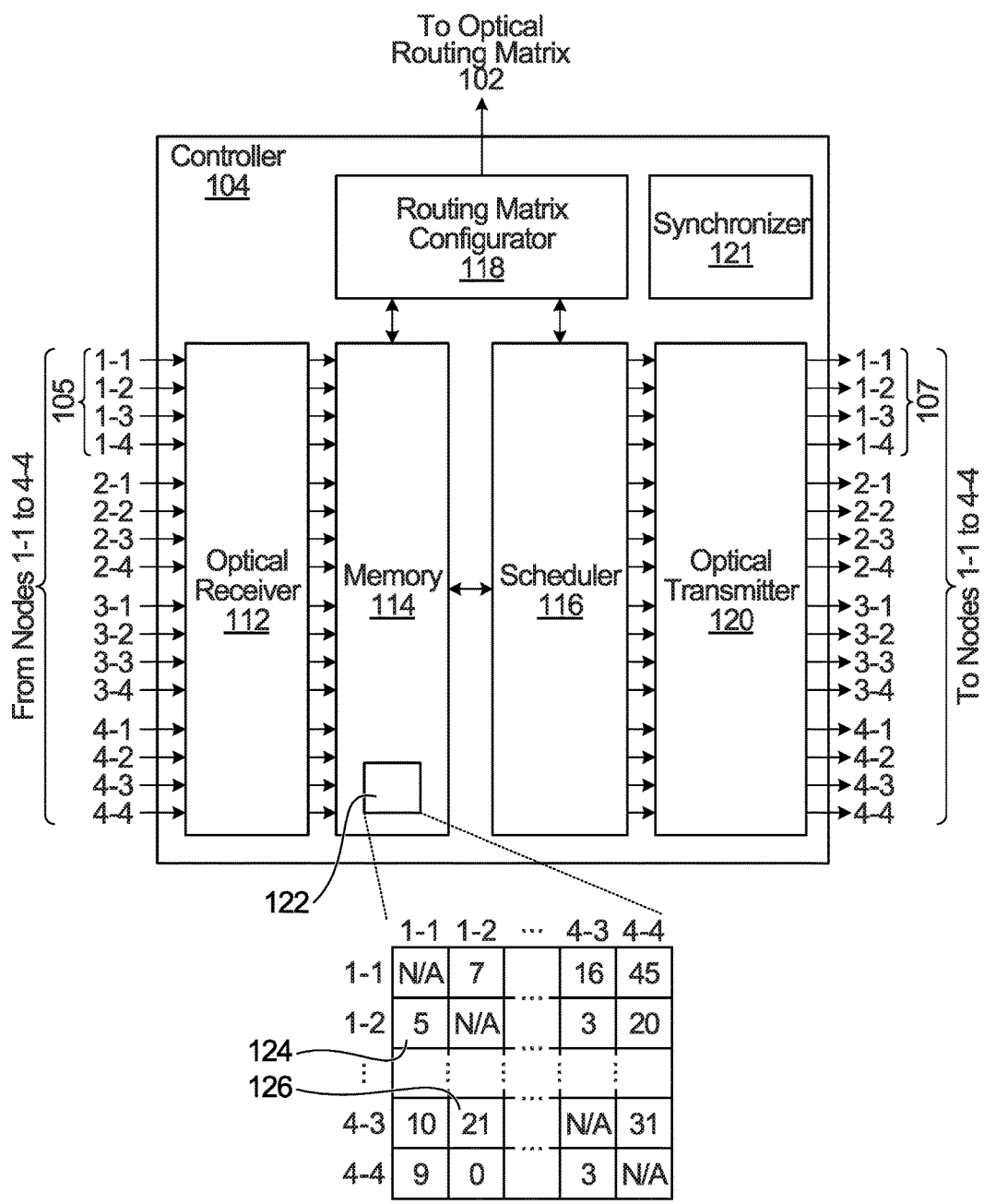
FIG. 3 is a block diagram of a controller, according to one embodiment.

FIG. 3 is a block diagram of the controller 104, according to one embodiment. The controller 104 includes an optical receiver 112, a memory 114, a scheduler 116, a routing matrix configurator 118, a synchronizer 121, and an optical transmitter 120. The optical receiver 112 and the optical transmitter 120 may be integrated into a single optical transceiver.

The optical receiver 112 includes a semiconductor detector, e.g. a photodiode or photodetector (not shown), to convert an optical signal from each one of nodes 1-1 to 4-4 into received control information in the electrical domain. Although one optical receiver 112 is shown, there may instead be a separate optical receiver for each node. The control information sent from each of the nodes 1-1 to 4-4 is stored in memory 114. The control information reports the amount of data each node has that is to be transmitted to each other node. A traffic demand matrix 122 may be stored in the memory 114 and updated every time new control information is received. An example traffic demand matrix 122 is illustrated in FIG. 3 with example entries. The rows of the traffic demand matrix 122 each correspond to a respective transmitting node, and the columns of the traffic demand matrix 122 each correspond to a respective receiving node. For example, node 1-2 has five packets to send to node 1-1, as shown at 124. As another example, node 4-3 has twenty one packets to send to node 1-2, as shown at 126. The main diagonal of the matrix 122 has entries "N/A" because a node does not transmit packets to itself.

The scheduler 116 schedules each node by determining, for each node and for each time slot, which data that node is to transmit at that time slot. Control information providing the scheduling information is generated for each node by the scheduler 116. The optical transmitter 120 includes a light emitting diode (LED) or a laser (not illustrated) to modulate control information for each node onto a respective optical signal. The routing matrix configurator 118 reconfigures the optical routing matrix 102 so that different nodes may communicate with each other during different time slots.

The scheduler 116, routing matrix configurator 118, and synchronizer 121 may each be implemented using a processor (not illustrated) that executes instructions to cause the processor to perform the respective operations of the scheduler 116, routing matrix configurator 118, and synchronizer 121. The same processor or different processors may be used to implement each component. Alternatively, the scheduler 116, routing matrix configurator 118, and synchronizer 121 may each be dedicated integrated circuitry (not illustrated), such as an application specific integrated circuit (ASIC), a graphics processing unit (GPU), or a programmed field programmable gate array (FPGA), for performing the respective operations of the scheduler 116, routing matrix configurator 118, and synchronizer 121. One set of integrated circuitry may be dedicated to implementing each of the scheduler 116, routing matrix configurator 118, and synchronizer 121. Alternatively, different integrated circuitry may be used to implement each of the scheduler 116, routing matrix configurator 118, and synchronizer 121.

The scheduler 116 receives instructions/messages from the nodes using the optical receiver 112, and the scheduler 116 transmits instructions/messages to the nodes using the optical transmitter 120. Similarly, the routing matrix configurator 118 and synchronizer 121 use a transmitter/receiver to transmit/receive messages.

The controller 104 operates the optical switching system 100 such that time is separated into a plurality of time slots, and at each time slot each node sends a burst of data destined for a particular node, at a particular wavelength, as controlled by the controller 104. A time slot is sometimes referred to as a data slot. During operation, at each time slot new control information is also sent from each of the nodes and received at the optical receiver 112 of the controller 104. The scheduler 116 uses the received control information to update the traffic demand matrix 122 so that it is documented in memory 114 how much data each node currently has to transmit to each other node. The scheduler 116 then performs scheduling 116 for the next time slot, or for the time slot a few time slots ahead, depending upon the latency of the communication channel between the controller 104 and the nodes. For simplicity, in this example the scheduler 116 schedules the next time slot, i.e., the time slot immediately after the current time slot. For the next time slot, the scheduler 116 determines the following for each node k: which other node k' the node k will transmit data to during the next time slot. The scheduler 116 determines this in part based on the traffic demand matrix 122. For example, in the traffic matrix 122 illustrated in FIG. 3, node 4-4 has no data packets to send to node 1-2, but node 4-4 has nine data packets to send to node 1-1. Therefore, the scheduler 116 may decide that in the next time slot, node 4-4 is to send data packets to node 1-1. A control signal is then generated by the scheduler 116 that indicates that in the next time slot node 4-4 is to transmit the data destined for node 1-1 using wavelength $\lambda_1$, because wavelength $\lambda_1$ is the optical wavelength at which node 1-1 can receive data. The control signal is transmitted to node 4-4 by the optical transmitter 120 of the controller 104. A similar scheduling operation is performed for each of the other nodes. In this way, for each time slot the scheduler 116 schedules, for each node, which data will be transmitted from that node at which wavelength. The data transmitted from each node and the wavelength used by each node to transmit the data may change for each node, each time slot.

However, when scheduling, the scheduler 116 must also work within the following additional constraints:

(1) For each time slot, the wavelength at which data is transmitted from one node in a cluster must be different from the wavelength at which data is transmitted from each other node in that same cluster. Specifically, a node in a cluster can only transmit data at one of four wavelengths: $\lambda_1$, or $\lambda_2$, or $\lambda_3$, or $\lambda_4$. When one node in the cluster is transmitting data at one of the four wavelengths, then another node in that same cluster cannot transmit data at the same time using the same wavelength. Instead, the other three nodes in the cluster must each use a respective one of the other three wavelengths. Otherwise, there will be collision in the optical coupler. For example, node 1-1 cannot transmit data to node 4-4 in the same time slot in which node 1-2 transmits data to node 3-4. Otherwise, there would be a collision because nodes 3-4 and 4-4 both receive data at wavelength $\lambda_4$, which would mean that both node 1-1 and 1-2 would need to transmit data at wavelength $\lambda_4$, which would cause a collision in optical coupler C1.

(2) At any given time, only certain nodes can communicate with certain other nodes due to the configuration of the optical routing matrix 102. Different clusters use the same four wavelengths $\lambda_1$ to $\lambda_4$, and so to prevent collision at any given time the optical routing matrix 102 only permits certain nodes to communicate with certain other nodes. For example, the optical routing matrix 102 may be configured to only permit node 4-4 to receive an optical signal of wavelength $\lambda_4$ from a node in cluster 1. When the optical routing matrix 102 is configured in this way, then no nodes from clusters 2 to 4 may transmit data to node 4-4.

Based on the conditions described above, the scheduler 116 executes a scheduling method that, for each node and for each time slot, determines the data that is to be transmitted from that node, and the wavelength at which that data is to be transmitted. One example scheduling method is as follows: (i) for each cluster, first determine the candidate nodes, i.e. the other nodes that are actually able to receive transmissions from the cluster based on the configuration of the optical routing matrix 102; (ii) then use the traffic demand matrix 122 to determine which node in the cluster has the greatest need to transmit data to a candidate node, e.g. based on how many packets the node has waiting to be sent to a particular candidate node; (iii) select a candidate node based on the determination in step (ii); and (iv) then repeat steps (ii) and (iii) for the other nodes in the cluster and the remaining candidate nodes. The example scheduling method may be modified to incorporate other factors also, e.g., the latency requirements of packets. Some packets may need to be transmitted almost immediately, e.g. to meet quality of service requirements, whereas other packets may be able to wait in the buffer for a while. How urgently a packet needs to be transmitted through the optical switching system may also be incorporated into the scheduling method. For example, the urgency/priority of each packet may act as a weighting factor in determining packet scheduling.

Over time, the optical routing matrix 102 is reconfigured to permit other nodes to communicate with each other. For example, the scheduler 116 may determine that a reconfiguration is necessary when a particular node has an amount of data to be transmitted to another node that exceeds a threshold, but the particular node cannot currently communicate with the other node due to the configuration of the optical routing matrix 102. The scheduler 116 may instruct the routing matrix configurator 118 to perform reconfiguration of the optical routing matrix 102. Alternatively, the routing matrix configurator 118 may reconfigure the optical routing matrix 102 on a periodic basis.

The synchronizer 121 uses slot timing information sent in the control information from the nodes, and performs timeslot synchronization to synchronize the arrival of the optical signals at the optical couplers C1 to C4 at each timeslot. The synchronizer 121 ensures the time slots between transmitting nodes are synchronized, and any necessary timeslot corrections are made to ensure synchronization. Therefore, the control information transmitted to each node not only includes the assigned wavelength and timeslot allocated to the nodes, but also includes any needed timeslot adjustment information. The timeslot synchronization may work as follows for each node. The control messages sent from the node may have a frame structure that is synchronized with the data timeslot for that node. Each control frame may correspond to a respective timeslot for the node. Data timeslot timing may be determined by the synchronizer 121 for the node by observing the frame timing of the control message from the node. If the control data is out of synchronization, then this indicates to the synchronizer 121 that the data slot timing is also out of synchronization for the node, and timeslot correction data may be sent from the synchronizer 121 to the node to adjust the data slot/control frame timing of the node.

Time slot synchronization is performed to help avoid wavelength conflict. Different path lengths traversed by different optical signals in the optical routing matrix 102 may cause a path length differential in the optical routing matrix 102 that may add to timeslot misalignment. The maximum path length differential in the optical routing matrix 102 also contributes to the gap at the end of each time slot between when each node stops transmitting data and when the next time slot begins. If there is a differential delay allowance of 5 ns, then one meter of path difference in the optical routing matrix 102 may be tolerable, which may be met by design.

Figure 4:
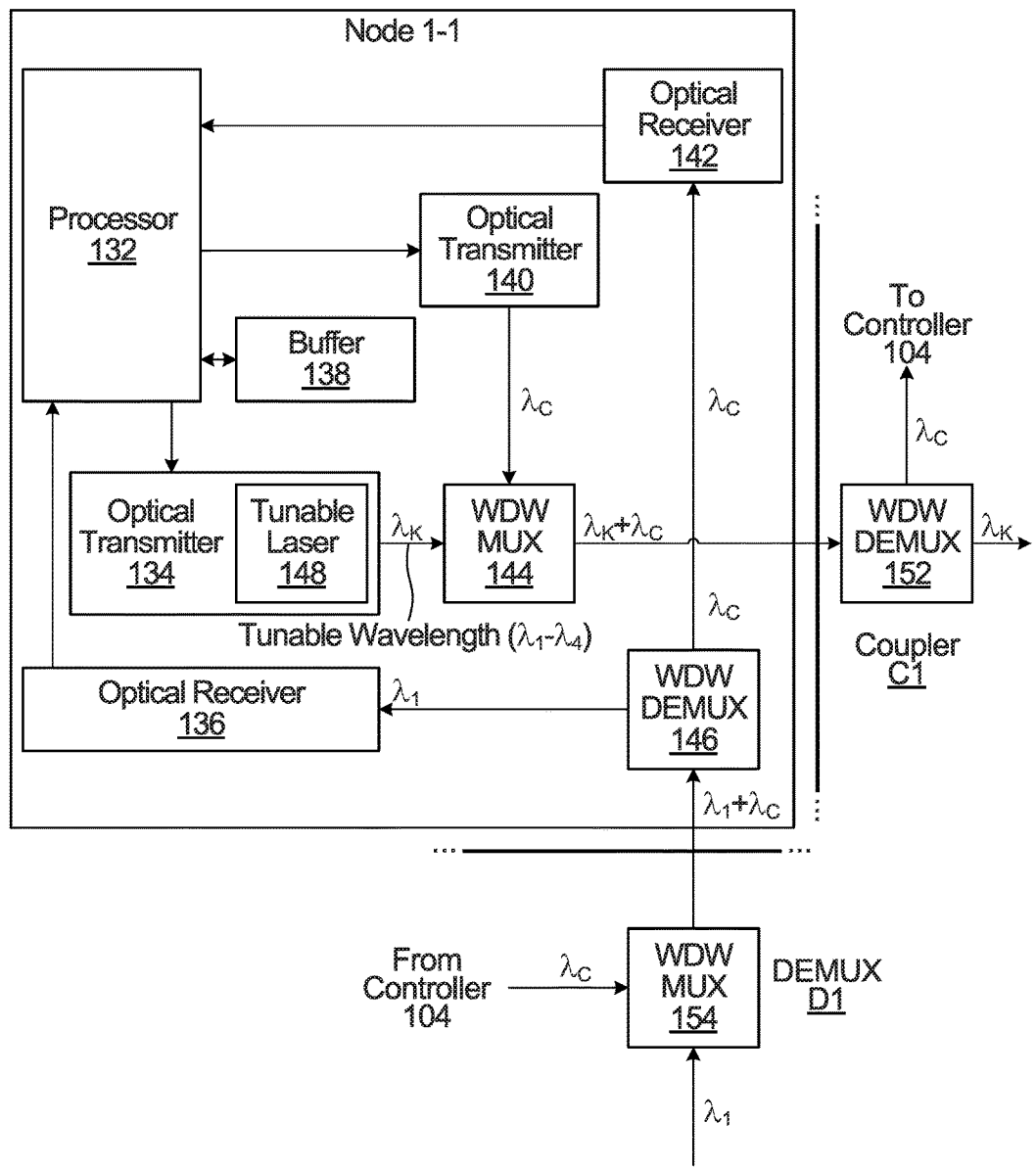
FIG. 4 is a block diagram of a node, according to one embodiment.

FIG. 4 is a block diagram of node 1-1, according to one embodiment. The other nodes in FIG. 2 have a similar structure and operate in a similar manner as that described below in relation to node 1-1. Node 1-1 includes a processor 132, which is coupled to optical transmitters 134 and 140, optical receivers 136 and 142, and a buffer 138. In some embodiments, the processor 132 may be a general purpose processor that executes instructions to perform the operations of the processor 132. In other embodiments, the processor 132 may be implemented by dedicated integrated circuitry, such as an ASIC, a GPU, or an FPGA. The optical transmitter 134 and optical receiver 136 may be integrated into a single optical transceiver. Similarly, the optical transmitter 140 and the optical receiver 142 may be integrated into a single optical transceiver.

Node 1-1 further includes a WDM multiplexer 144 to multiplex the optical output of optical transmitters 134 and 140. Node 1-1 further includes a WDM demultiplexer 146 to separate the received optical signal into two optical signals: a first optical signal of wavelength $\lambda_1$, which is sent to optical receiver 136, as well as a second optical signal of wavelength $\lambda_c$, which is sent to optical receiver 142. $\lambda_c$ is an OOB wavelength used to transmit control information. $\lambda_c$ is different from $\lambda_1$ to $\lambda_4$. All of nodes 1-1 to 4-4 may use the same optical wavelength $\lambda_c$ for the transmission of control information. The same wavelength $\lambda_c$ may also be used by the other nodes 1-2 to 4-4 to send/receive control information.

The optical transmitter 134 includes a tunable laser 148 that modulates data onto an optical signal of one of four wavelengths $\lambda_1$ to $\lambda_4$, depending upon the node to which the data is being transmitted. The optical transmitter 134 is a fast wavelength tuned transmitter for performing wavelength switching. The optical transmitter 140 includes an LED or a laser (not illustrated) to modulate control information onto an optical signal of wavelength $\lambda_c$. The optical receiver 136 includes a semiconductor detector, e.g. a photodiode or photodetector (not shown), to convert an optical signal of wavelength $\lambda_1$ to received data in the electrical domain. The optical receiver 142 includes a semiconductor detector to convert an optical signal of wavelength $\lambda_c$ to receive control information in the electrical domain.

Buffer 138 implements a plurality of virtual output queues. One virtual output queue is implemented for each other node. The buffer 138 may comprise physical memory. In other embodiments, the buffer 138 may not implement virtual output queues, but instead the buffer 138 may comprise a plurality of physical queues, which may be implemented by memory or by physical registers.

Figure 5:
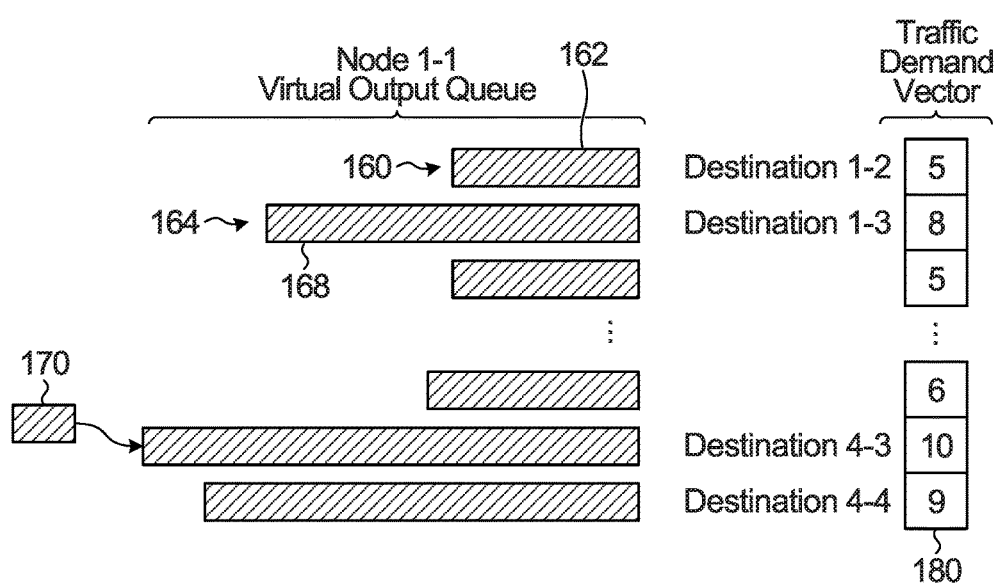
FIG. 5 illustrates virtual output queues, according to one embodiment.

FIG. 5 illustrates the virtual output queues implemented by buffer 138, according to one embodiment. There are fifteen virtual output queues, each one corresponding to a respective one of the other nodes, and each one storing data to be transmitted to that other node. For example, virtual output queue 160 corresponds to node 1-2, and virtual output queue 160 has data 162 stored therein that is to be transmitted to node 1-2. As another example, virtual output queue 164 corresponds to node 1-3, and virtual output queue 164 has data 168 stored therein that is to be transmitted to node 1-3. There is more data waiting to be transmitted to node 1-3 than there is data waiting to be transmitted to node 1-2. At the point in time illustrated in FIG. 5, new data 170, that is destined for node 4-3, arrives at node 1-1, and the processor 132 therefore instructs this data 170 to be stored in the virtual output queue corresponding to 4-3. A traffic demand vector 180 is also illustrated in FIG. 5. The traffic demand vector 180 tracks the size of each virtual output queue, i.e. how much data is in each virtual output queue. The traffic demand vector 180 may be stored in the buffer 138. At the point in time illustrated in FIG. 5, there are five packets of data stored in virtual output queue 160, eight packets of data stored in virtual output queue 164, . . . etc.

Returning to FIG. 4, a WDM demultiplexer 152 is illustrated in the optical coupler C1 for separating the optical signal of wavelength $\lambda_c$, which carries the control information from node 1-1. The control information may comprise the traffic demand vector 180. The optical signal of wavelength $\lambda_c$ is transmitted to the controller 104. The WDM demultiplexer 152 may instead be separate from the optical coupler C1, e.g. on the signal path just before the optical coupler C1.

A WDM multiplexer 154 is also illustrated in the wavelength demultiplexer D1 for multiplexing the optical signal of wavelength $\lambda_c$, which is from the controller 104 and which carries the control information for the node 1-1. Alternatively, the WDM multiplexer 154 may instead be separate from the wavelength demultiplexer D1, e.g. on the signal path just after the wavelength demultiplexer D1.

In operation, when data that is to be transmitted to another node is received at node 1-1, the processor 132 instructs the data to be stored in buffer 138 in the virtual output queue corresponding to the other node. The processor 132 then updates the traffic demand vector 180 illustrated in FIG. 5. Each time slot, the processor 132 transmits data from one of the virtual output queues by using the optical transmitter 134 to modulate the data onto an optical signal of wavelength $\lambda_k$, where k is 1, 2, 3, or 4. The virtual output queue from which the data is taken and the corresponding transmission wavelength $\lambda_k$ is selected by the processor 132 based on the scheduling for that timeslot received from the controller 104. During the time slot, the processor 132 also retrieves the traffic demand vector 180 and encapsulates the traffic demand vector 180 into one or more control packets to form control information. The control information is modulated onto an optical signal of wavelength $\lambda_k$ by optical transmitter 140. The optical signal of wavelength $\lambda_k$, is multiplexed with the optical signal of wavelength $\lambda_k$ using WDM multiplexer 144, and the multiplexed signal is transmitted from node 1-1. At the optical coupler C1, the optical signal of wavelength $\lambda_c$ is separated from the optical signal of wavelength $\lambda_k$ by WDM demultiplexer 152. The optical signal of wavelength $\lambda_c$ is sent to the controller 104, and the optical signal of wavelength $\lambda_k$ propagates into the optical coupler C1 for transmission through the optical routing matrix 102. During the time slot, data from another node that was transmitted during the time slot and that is destined for node 1-1 is received one an optical signal at wavelength $\lambda_1$. However, the optical signal at wavelength $\lambda_1$ is multiplexed, by WDM multiplexer 154, with an optical signal of wavelength $\lambda_c$ from controller 104. The optical signal of wavelength $\lambda_c$ from controller 104 carries scheduling information for a next time slot and (if necessary) timeslot correction data. The WDM multiplexer 146 in node 1-1 separates the optical signal of wavelength $\lambda_c$ from the optical signal of wavelength $\lambda_1$. The optical signal of wavelength $\lambda_c$ is sent to optical receiver 142, which converts the optical signal into control information in the electrical domain. The control information is processed by the processor 132 so that the processor 132 can schedule transmission for the next time slot and (if necessary) perform timeslot correction. The optical signal of wavelength $\lambda_1$ is sent to optical receiver 136, which converts the optical signal into data in the electrical domain. The data is sent by the processor 132 to its appropriate destination in node 1-1.

Example implementations of the optical routing matrix 102 will now be provided.

In one embodiment, the optical routing matrix 102 is an M×M wavelength selective switch (WSS). In an M×M WSS, any wavelength arriving on any one of the M inputs can be transmitted to any one of the M outputs. A WSS is configurable to set the output to which each wavelength on each input is to be connected.

Figure 6:
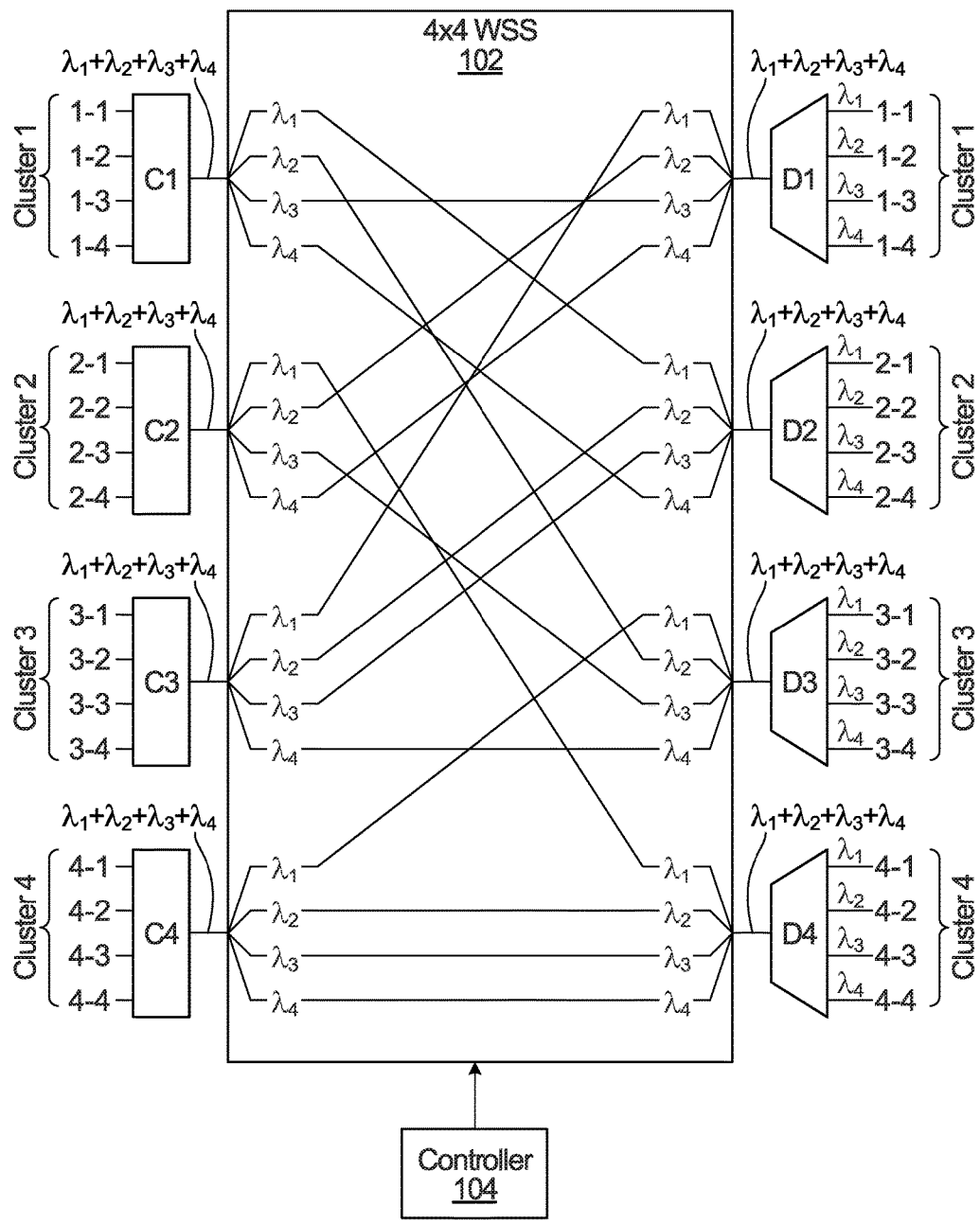
FIG. 6 is the system of FIG. 2 for the case in which the optical routing matrix is implemented by a 4×4 wavelength selective switch (WSS)

FIG. 6 is the system of FIG. 2 for the case in which the optical routing matrix 102 is implemented by a 4×4 WSS. The nodes 1-1 to 4-4 have been indicated using just their reference number, and the control between the nodes and the controller 104 has been omitted for the sake of clarity. The 4×4 WSS has been configured by the controller 104 to connect wavelengths between inputs and outputs in the manner illustrated in FIG. 6. For example, the optical signal of wavelength $\lambda_1$ in the combined optical signal output by optical coupler C1 is separated from the combined optical signal and propagated to the output of the WSS connected to wavelength demultiplexer D2. The optical signal of wavelength $\lambda_2$ in the combined optical signal output by optical coupler C1 is separated from the combined optical signal and propagated to the output of the WSS connected to wavelength demultiplexer D3. The optical signal of wavelength $\lambda_3$ in the combined optical signal output by optical coupler C1 is separated from the combined optical signal and propagated to the output of the WSS connected to wavelength demultiplexer D1. The optical signal of wavelength $\lambda_4$ in the combined optical signal output by optical coupler C1 is separated from the combined optical signal and propagated to the output of the WSS connected to wavelength demultiplexer D2.

Note that the configuration of the 4×4 WSS is set such that only one optical signal of each wavelength is propagated to each output. This configuration avoids a collision, but the configuration also limits which nodes may communicate with each other. For example, any one of the nodes 1-1 to 1-4 may send data to node 2-1 on an optical signal of wavelength $\lambda_1$. However, none of the nodes 1-1 to 1-4 may send data to node 1-1 or node 3-1 or node 4-1.

The controller 104 may configure/reconfigure the 4×4 WSS by having the routing matrix configurator 118 in the controller 104 send a signal to the 4×4 WSS indicating the configuration or reconfiguration. For example, a WSS may include a module with a processor and a communication interface (not illustrated). The routing matrix configurator 118 may send an instruction through the communication interface of the WSS to the processor of the WSS. The instruction may cause the processor of the WSS to configure or reconfigure the WSS by setting, for at least one optical wavelength arriving at an input of the WSS, a corresponding output of the WSS to which the optical wavelength is transmitted. The instruction sent from the routing matrix configurator 118 may specify exactly which wavelengths at which WSS inputs are to be propagated to which WSS outputs.

Figure 7:
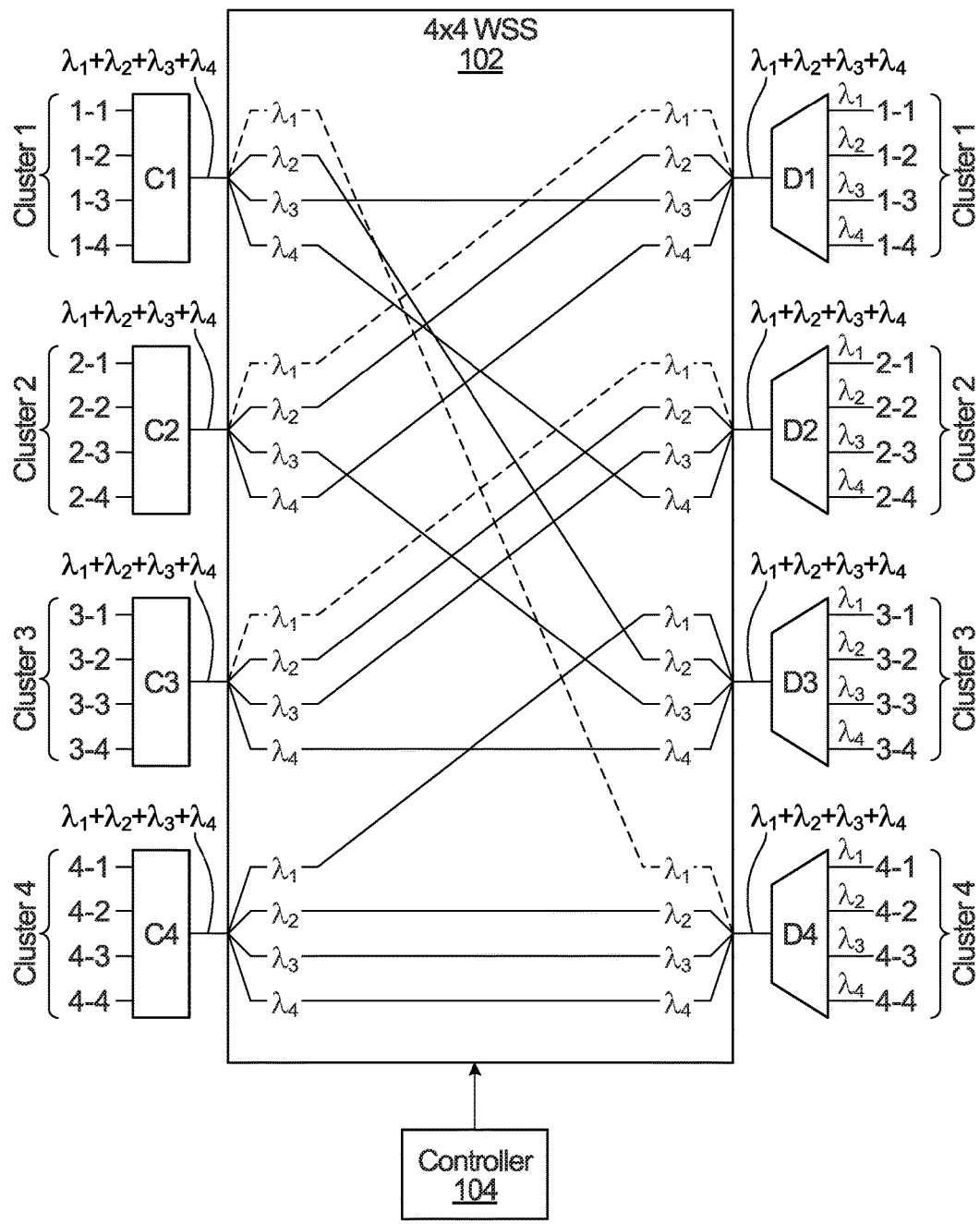
FIG. 7 is the system of FIG. 6, but showing the 4×4 WSS after a reconfiguration.

FIG. 7 is the system of FIG. 6, but showing the 4×4 WSS after a reconfiguration affecting how the optical signals of wavelength $\lambda_1$ are propagated. The modified propagation paths are illustrated using stippled lines so that the modification may be more easily observed. With the reconfiguration illustrated in FIG. 7, any one of the nodes 1-1 to 1-4 may send data to node 4-1 on an optical signal of wavelength $\lambda_1$. However, none of the nodes 1-1 to 1-4 may send data to node 1-1 or node 2-1 or node 3-1.

During operation the 4×4 WSS is reconfigured by the controller 104, on a periodic basis or as necessary, so that over time all nodes have the opportunity to communicate with all other nodes.

Figure 8:
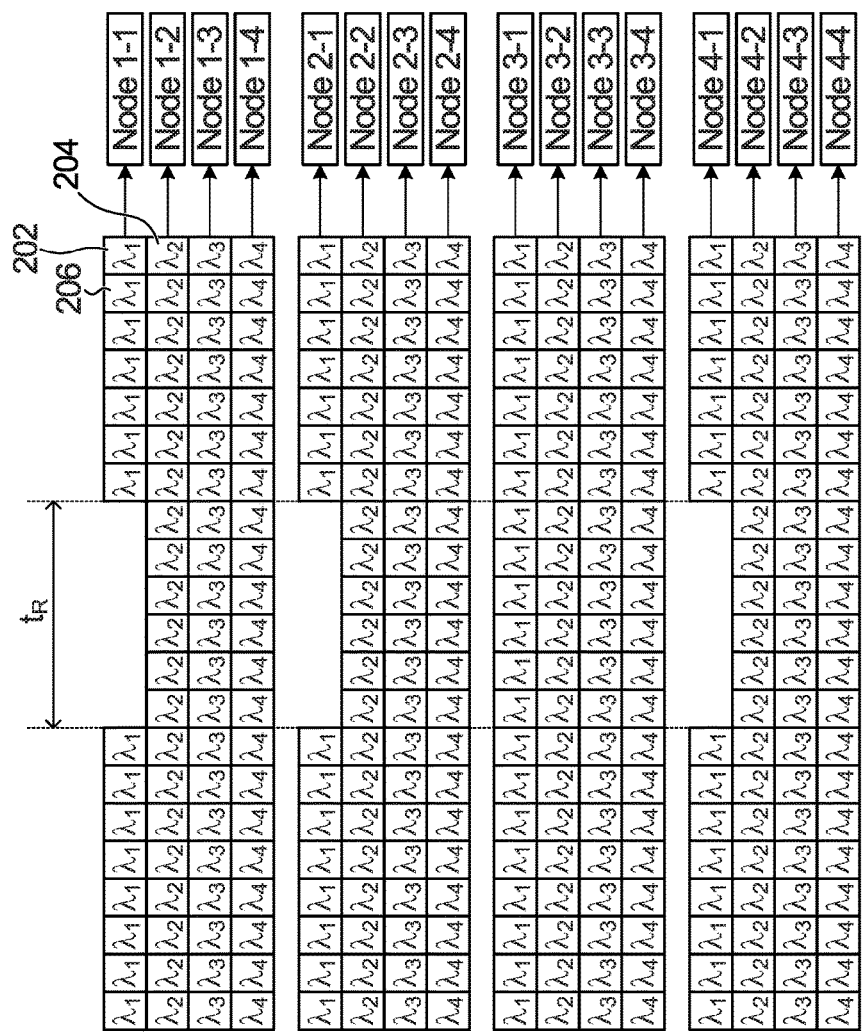
FIG. 8 illustrates a flow of data over multiple time slots, according to one embodiment.

The time it takes for a WSS to be reconfigured may be several time slots in duration. Therefore, during reconfiguration, the propagation paths being reconfigured are not scheduled by the controller 104 to transmit data. FIG. 8 illustrates a flow of data over multiple time slots, according to one embodiment. Each block in FIG. 8 is a time slot carrying data at a particular wavelength. For example, block 202 is the data transmitted to node 1-1 on wavelength $\lambda_1$ during a first time slot, block 204 is the data transmitted to node 1-2 on wavelength $\lambda_2$ during the first time slot, block 206 is the data transmitted to node 1-1 on wavelength $\lambda_1$ during a second time slot, etc. FIG. 8 is from the perspective of the receiving portion of nodes 1-1 to 4-4. The data transmitted to a particular node during a particular time slot originates from a single node, but the node from which the data is transmitted may change time slot to time slot.

Time duration $t_R$ in FIG. 8 represents the duration of time it takes for the reconfiguration shown in FIG. 7 to be performed. $t_R=6$ time slots in FIG. 8. In actual implementation, the number of time slots it takes for the reconfiguration may range from only a few time slots to hundreds of time slots. The number of time slots it takes for reconfiguration also depends upon the duration of each time slot. If a long enough time slot is used, then the reconfiguration may occur within one or only a few time slots. For the duration $t_R$, the controller 104 does not schedule any data for transmission to nodes 1-1, 2-1, and 4-1, because the propagation paths corresponding to these nodes is being reconfigured. However, data may be scheduled for transmission to other nodes. Hence, the reconfiguration is only partial reconfiguration, with only the reconfigured propagation paths affected. The scheduling is coordinated by the controller so that interconnections temporarily out of service, due to the reconfiguration of the WSS, are not used to transmit data.

Figure 9:
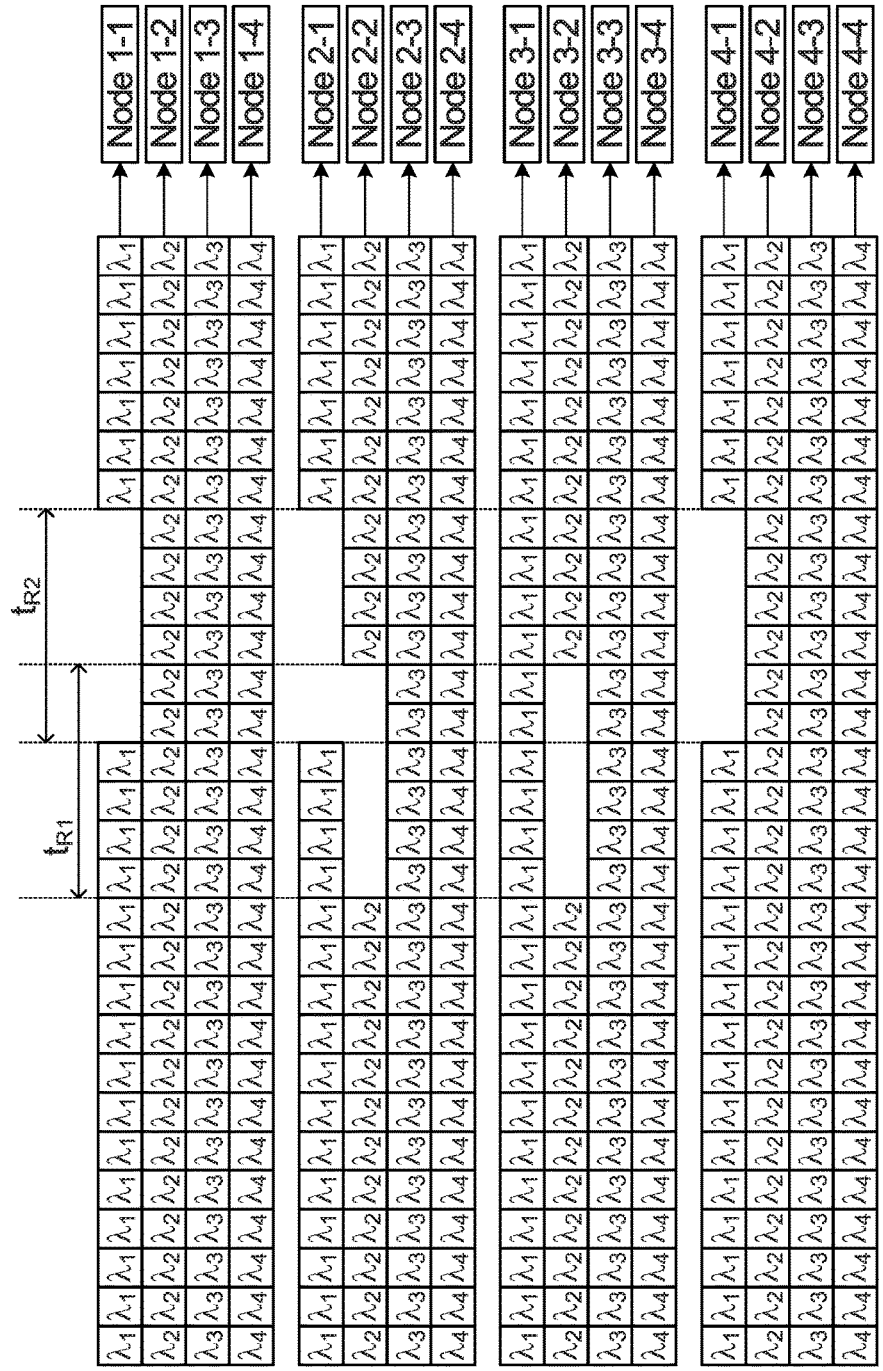
FIG. 9 illustrates a flow of data over multiple time slots, according to another embodiment.

When a large number of propagation paths need to be reconfigured, the propagation paths may be grouped into different reconfiguration groups for potentially better flexibility and for potentially less down time. Different wavelengths that do not interfere with each other may be grouped into different reconfiguration groups. The same wavelength of different receiving clusters may still be in different reconfiguration groups if the wavelengths do not affect each other. The different reconfiguration groups may be reconfigured separately. In this way, out-of-service time and the number of out-of-service paths may be reduced. FIG. 9 illustrates a flow of data over multiple time slots, according to another embodiment. In FIG. 9, the reconfiguration of the propagation paths leading to nodes 2-2 and 3-2 occurs over time duration $t_{R1}$, and the reconfiguration of the propagation paths leading to nodes 1-1, 2-1, and 4-1 occurs over time duration $t_{R2}$. Time durations $t_{R1}$ and $t_{R2}$ partially overlap in FIG. 9. In general, $t_{R1}$ and $t_{R2}$ may fully overlap, partially overlap, or not overlap at all.

Figure 10:
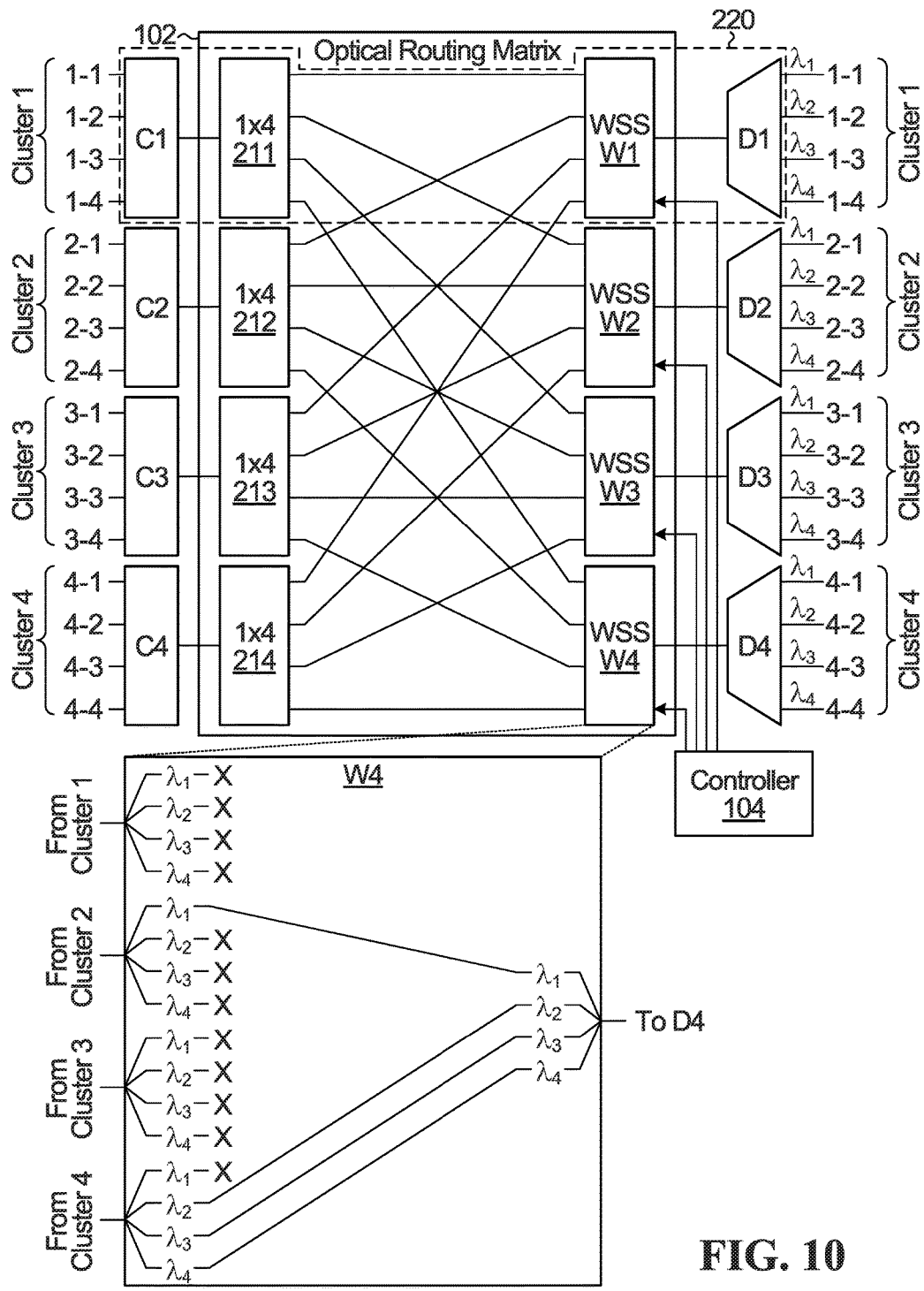
FIG. 10 is the system of FIG. 2 for the case in which the optical routing matrix is implemented by four 4×1 WSS's.

Another example implementation of the optical routing matrix 102 will now be described. Instead of having a single M×M WSS, the optical routing matrix 102 may be constructed using M M×1 WSS's. FIG. 10 is the system of FIG. 2 for the case in which the optical routing matrix 102 is implemented by four 4×1 WSS's. The nodes 1-1 to 4-4 have been indicated using just their reference number, and the control between the nodes and the controller 104 has been omitted for the sake of clarity. Each one of the 4×1 WSS's has been respectively labelled W1, W2, W3, and W4. The optical routing matrix 102 further includes four 1×4 splitters, respectively labelled 211, 212, 213, and 214. Each splitter outputs four copies of the optical signal received at the splitter input. Each output of each splitter is connected to a respective input of a 4×1 WSS. In operation, the combined optical signal output from optical coupler C1 passes through splitter 211 and is propagated to a first input of each of the WSS's. The combined optical signal output from optical coupler C2 passes through splitter 212 and is propagated to a second input of each of the WSS's. The combined optical signal output from optical coupler C3 passes through splitter 213 and is propagated to a third input of each of the WSS's. The combined optical signal output from optical coupler C4 passes through splitter 214 and is propagated to a fourth input of each of the WSS's. Each 4×1 WSS is configured by the controller 104 to propagate one input optical signal from each of the four wavelengths $\lambda_1$ to $\lambda_4$. All of the other input optical signals are blocked. As an example, WSS W4 is illustrated in more detail in FIG. 10 and shows one possible configuration. WSS W4 is configured to propagate: an optical signal having wavelength $\lambda_1$ that originates from cluster 2, an optical signal having wavelength $\lambda_2$ that originates from cluster 4, an optical signal having wavelength $\lambda_3$ that originates from cluster 4, and an optical signal having wavelength $\lambda_4$ that originates from cluster 4. All of the other incoming optical signals are blocked, i.e. not propagated. Each of the other WSS's have a different configuration, and the configurations of the WSS's are changed over time by the controller 104 such that over time each node has the chance to send data to each other node. Different propagation paths in each of the WSS's may be reconfigured at different times, e.g. as described above in relation to FIGS. 8 and 9.

The optical routing matrix 102 illustrated in FIG. 10 is equivalent to the 4×4 WSS illustrated in FIG. 6. The FIG. 10 implementation has a potential drawback compared to the FIG. 6 implementation in that four WSS's and four splitters are used. However, the FIG. 10 implementation has the following potential benefits compared to the FIG. 6 implementation: M×1 WSS's may be more readily available compared to an M×M WSS, and the FIG. 6 implementation is modular, i.e., the number of M×1 WSS's and splitters may be changed to accommodate more or fewer node clusters. Stippled bubble 220 illustrates a modular component of the FIG. 10 implementation. The optical routing matrix 102 has four of the modular components. To accommodate more or fewer node clusters, modular components may be added or removed, along with adding/removing the appropriate fiber connections to/from the splitter and WSS of each modular component.

Another example implementation of the optical routing matrix 102 will now be described. Instead of using one or more WSS's, an M×M silicon-photonic (SiP) switching matrix may be used. An M×M SiP switching matrix may allow for a switching time as short as 10 ns. A possible benefit of using a SiP switching matrix instead of one or more WSS's is that the SiP switching matrix may have a faster reconfiguration time. For example, a WSS may have a reconfiguration time of around 11.5 μs, whereas the reconfiguration time of the SiP switching matrix may be less than one time slot, such that the SiP switching matrix may be reconfigured synchronously with the slot switching. Reconfiguration may occur every time slot, if needed. However, a potential drawback of using a SiP switching matrix is that for any given configuration, one cluster of nodes can only communicate with another one cluster of nodes.

Figure 11:
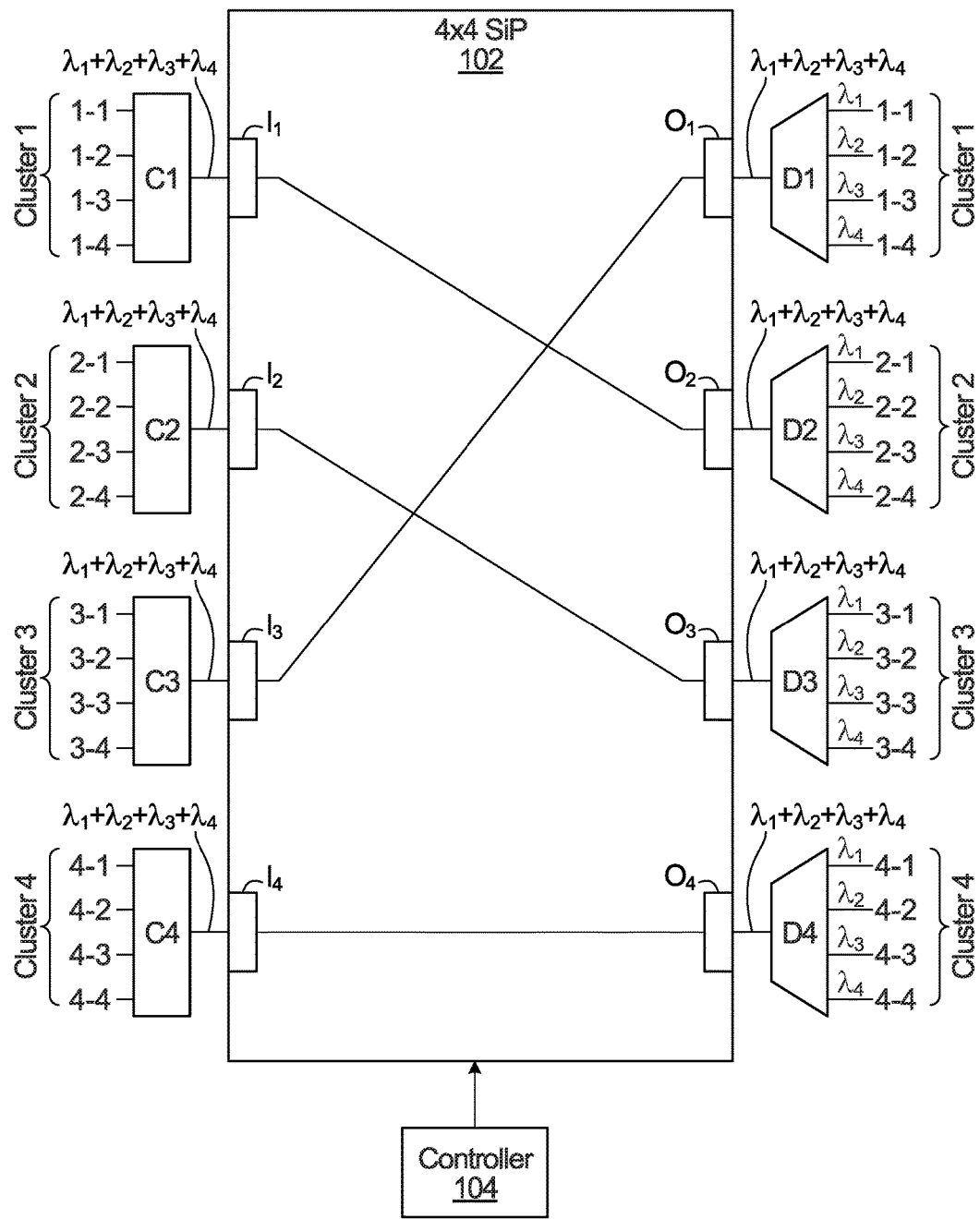
FIG. 11 is the system of FIG. 2 for the case in which the optical routing matrix is implemented by a 4×4 silicon-photonic (SiP)

FIG. 11 is the system of FIG. 2 for the case in which the optical routing matrix 102 is implemented by a 4×4 SiP. The nodes 1-1 to 4-4 have been indicated using just their reference number, and the control between the nodes and the controller 104 has been omitted for the sake of clarity. The 4×4 SiP has four input ports $I_1$ to $I_4$, as well as four output ports $O_1$ to $O_4$. Any input port may be connected to any output port. The connection between the input and output ports is configured by the controller 104. In the example shown in FIG. 11, the SiP has been configured by the controller 104 as follows: the optical signal output from optical coupler C1 is connected to the wavelength demultiplexer D2, the optical signal output from optical coupler C2 is connected to the wavelength demultiplexer D3, the optical signal output from optical coupler C3 is connected to the wavelength demultiplexer D1, and the optical signal output from optical coupler C4 is connected to the wavelength demultiplexer D4. Therefore, for example, nodes from cluster 1 may only transmit data to other nodes in cluster 2. During operation the SiP is reconfigured by the controller 104, on a periodic basis or as necessary, so that over time all nodes have the opportunity to communicate with all other nodes. The SiP may be configured or reconfigured by having the controller 104 send an instruction to a communication interface of the SiP, the instruction indicating to the SiP the connections between the four input ports and the four output ports. A 4×4 SiP may actually be implemented by a smaller number of SiPs (e.g. 2×1 SiPs and/or 1×2 SiPs), and processing circuitry associated with the 4×4 SiP may set the input/output connections of each of the smaller SiPs based on the configuration or reconfiguration instruction received from the controller 104 through the communication interface.

N=M=4 in all of the embodiments described above with respect to FIGS. 2 to 11. That is, there are four clusters (M=4), and each cluster has four nodes (N=4). As is clear from FIG. 1, the principles described above may be extended to any value of M and N. For example, in actual implementation N may be between 80 and 100 to correspond to the number of channels in the C band. If N is 80, then each node of each cluster may transmit data at one of eighty optical wavelengths $\lambda_1$ to $\lambda_{80}$. In the embodiment described above with respect to FIGS. 6 and 7, N may instead equal 80 and M may instead equal 20 in actual implementation, to achieve switching between 80×20=1600 nodes. In the embodiment described above with respect to FIG. 10, N may instead equal 80 and M may instead equal 4 in actual implementation, to achieve switching between 80×4=320 nodes. If 20×1 WSS's are available, then M may instead be equal to 20 to achieve switching between 80×20=1600 nodes. In the embodiment described above with respect to FIG. 11, N may instead equal 80 and M may instead equal 8 in actual implementation, to achieve switching between 80×8=640 nodes.

As mentioned earlier with respect to FIG. 1, the optical switching system optionally includes amplifiers 101 and/or 103. If amplifiers 101 are included, then only one amplifier 101 per cluster is used, which is beneficial over having one amplifier per node. Similarly, if amplifiers 103 are included, then only one amplifier 103 per cluster is used. The system in FIG. 1 has maximum 2M amplifiers. As an example, if N=80 in FIG. 1, then each 80×1 coupler may have a loss of 19 dB, which may be compensated for by a single amplifier 101 downstream of each coupler. If the optical routing matrix 102 in FIG. 1 is an M×M WSS, then the loss in the M×M WSS may be less than 20 dB, which may be compensated for by a single amplifier 103 downstream of each output of the M×M WSS. In the system of FIG. 1, there are maximum two amplifiers in any channel from a transmitting node to a receiving node. 30 dB or more of optical signal to noise ratio (OSNR) may be achievable for data speeds of greater than 200 Gbps for dual-polarization coherent 16-QAM. The system of FIG. 1 may also have a low filtering effect since a channel from a transmitting node to a receiving node may only have a filtering effect in the optical routing matrix and the optical demultiplexer.

Figure 12:
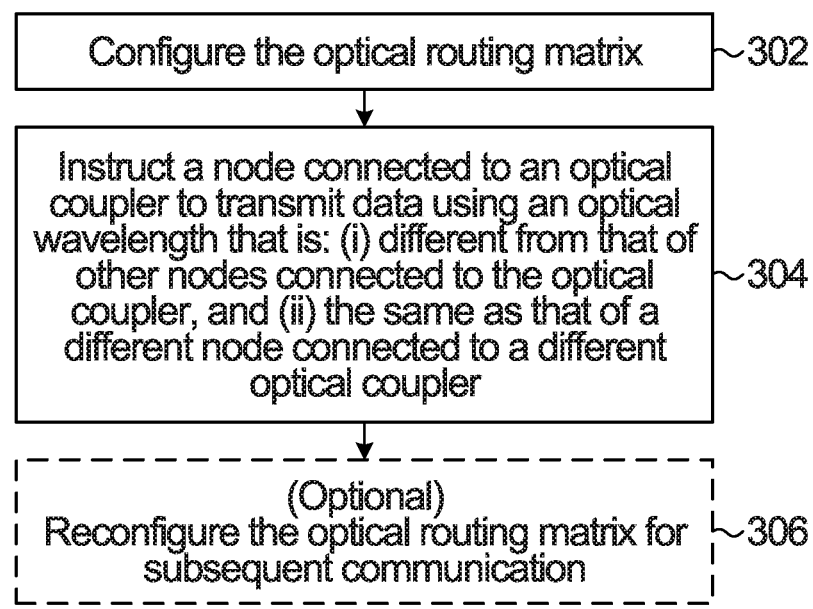
FIG. 12 is a flowchart of a method performed by a controller, according to one embodiment.

FIG. 12 is a flowchart of a method performed by a controller, according to one embodiment. The method involves communicating with an optical routing matrix and a plurality of nodes in an optical switching system. For example, the optical switching system may be the system 100 illustrated in FIG. 1. More generally, the optical switching system has the following structure. The optical routing matrix is interposed between a plurality of optical couplers and a plurality of wavelength demulitplexers. The optical routing matrix transmits optical signals between the optical couplers and the wavelength demulitplexers. Each one of the optical couplers has an output and a plurality of inputs. Each input of the plurality of inputs is for optical connection to a respective one of the plurality of nodes. Each one of the wavelength demultiplexers has an input and a plurality of outputs, and each output of the plurality of outputs is also for optical connection to a respective one of the plurality of nodes. The optical routing matrix has a plurality of inputs and a plurality of outputs. Each input of the optical routing matrix is optically connected to the output of a respective one of the optical couplers. Each output of the optical routing matrix is optically connected to the input of a respective one of the wavelength demultiplexers.

In step 302, the controller configures the optical routing matrix to set, for each optical wavelength arriving at each input of the optical routing matrix, a corresponding output of the optical routing matrix to which the optical wavelength is transmitted. An example configuration is illustrated in FIG. 6 for the case in which the optical routing matrix is a WSS. The optical routing matrix may be configured such that no optical signals of the same wavelength are transmitted to the same output of the optical routing matrix. The controller may explicitly perform such a configuration, or the structure of the optical routing matrix may inherently provide such a configuration, e.g., the structure of the optical routing matrix may be such that it cannot transmit optical signals of the same wavelength to the same output of the optical routing matrix.

In step 304, the controller transmits an instruction to a first node of the plurality of nodes (e.g. node 1-1). The instruction, when executed by the first node, causes the first node to transmit data during a time slot, the data destined for a second node of the plurality of nodes (e.g. node 2-1). The data is transmitted to the optical coupler to which the first node is optically connected. The data is transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers. For example, in FIG. 6, each node connected to each optical coupler can only transmit at one of four optical wavelengths, but the four optical wavelengths are the same for each cluster of nodes.

Optionally, in step 306 the method further includes the controller reconfiguring the optical routing matrix for subsequent communication during a subsequent time slot. The reconfiguration includes changing, for a particular optical wavelength arriving at a particular input of the optical routing matrix, a corresponding output of the optical routing matrix to which the particular optical wavelength is transmitted. After the reconfiguration the first node may be unable to transmit data to the second node. For example, in FIG. 6 node 1-1 may transmit data to node 2-1, but after the reconfiguration in FIG. 7 node 1-1 may not transmit data to node 2-1. Instead, after the reconfiguration node 1-1 may transmit data to node 4-1.

In some embodiments, step 306 further includes the controller instructing a subset of the plurality of nodes to transmit data, through the optical routing matrix, when the optical routing matrix is being reconfigured, but the subset of the plurality of nodes are instructed to transmit data using optical wavelengths different from the particular optical wavelength having its propagation path reconfigured. An example is described earlier with respect to FIGS. 8 and 9.

In some embodiments, the method further includes, prior to the time slot, receiving from the first node a message indicating how much data the first node has to transmit to each one of other nodes of the plurality of nodes. The other nodes include the second node. An example of such a message is the traffic demand vector 180 of FIG. 5. The controller may then generate the instruction based on both the message and: the configuration of the optical routing matrix and/or which optical wavelengths are to be used during the time slot by other nodes connected to the optical coupler to which the first node is optically connected. In some embodiments, the instruction is transmitted using an optical signal having an OOB optical wavelength.

In some embodiments, the method further includes, for each node of the plurality of nodes including the first node: transmitting an instruction to the node that, when executed by the node, causes the node to transmit data during the time slot. The data is destined for another node, and the data is transmitted to an optical coupler of the plurality of optical couplers to which the node is optically connected. The data is transmitted using an optical signal having an optical wavelength that is: (i) different from an optical wavelength of any other optical signal transmitted, during the time slot, by any other node connected to the optical coupler to which the node is optically connected, and (ii) the same as the optical wavelength of another optical signal transmitted by a different node, during the time slot, connected to another optical coupler of the plurality of optical couplers.

The optical routing matrix may have different structures. For example, the optical routing matrix may be implemented using at least one WSS. In one embodiment, the optical routing matrix includes a plurality of optical splitters. Each optical splitter has an input and a plurality of outputs. Each optical slitter may be configured to output, at each output of the optical splitter, the optical signal arriving at the input of the optical splitter. The optical routing matrix further includes a plurality of WSS's. Each WSS has an output and a plurality of inputs. For each optical splitter of the optical splitters: the input of the optical splitter is optically connected to the output of a respective one of the optical couplers, and each output of the optical splitter is optically connected to a respective input of a different one of the WSS's. For each WSS of the plurality of WSS's: each input of the WSS is optically connected to a respective output of a different one of the optical splitters, and the output of the WSS is optically connected to the input of a respective one of the wavelength demultiplexers. The controller may then configure the optical routing matrix by configuring each one of the WSS's. Each WSS may be configured by setting the WSS to propagate, to the output of the WSS, only some of the optical wavelengths arriving at the inputs of the WSS. In other embodiments, the optical routing matrix does not include any WSS's, e.g. the optical routing matrix may be a SiP switch.

In some embodiments, the optical switching system includes a plurality of optical amplifiers interposed between the plurality of optical couplers and the optical routing matrix. Each optical coupler is optically connected to the optical routing matrix through a respective one of the optical amplifiers.

In some embodiments, each input of each optical coupler of the plurality of optical couplers is for optical connection to a different node of the plurality of nodes, and each output of each wavelength demultiplexer is also for optical connection to a different node of the plurality of nodes. Each output of each wavelength demultiplexer may be for optical connection to a respective node equal to a respective one of the nodes to which an input of an optical coupler is connected. An example of such a structure is illustrated in FIG. 1.

In some embodiments, each optical coupler of the optical couplers is to receive a respective plurality of input optical signals by receiving, at each one of the plurality of inputs, a respective optical signal at a respective wavelength from a respective node of the plurality of nodes. Each optical coupler is to combine the plurality of input optical signals into a combined optical signal and output the combined optical signal to the optical routing matrix. The optical wavelengths in the combined optical signal output from the coupler are mutually exclusive. In some embodiments, each wavelength demultiplexer is to demultiplex the optical signal received from the optical routing matrix into a plurality of output optical signals, each one of the plurality of output optical signals having a respective different wavelength. An example of such a structure is illustrated in FIG. 1.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. An optical switching system for switching data between a plurality of nodes, the optical switching system comprising:
 a plurality of optical couplers, each one of the optical couplers having an output and a plurality of inputs; each input of the plurality of inputs for optical connection to a respective one of the plurality of nodes;
 a plurality of wavelength demultiplexers, each one of the wavelength demultiplexers having an input and a plurality of outputs, each output of the plurality of outputs also for optical connection to a respective one of the plurality of nodes;
 an optical routing matrix interposed between the optical couplers and the wavelength demulitplexers, the optical routing matrix to transmit optical signals between the optical couplers and the wavelength demultiplexers;
 the optical routing matrix having a plurality of inputs and a plurality of outputs; each input of the optical routing matrix optically connected to the output of a respective one of the optical couplers, and each output of the optical routing matrix optically connected to the input of a respective one of the wavelength demultiplexers;
 a controller to:
  configure the optical routing matrix to set, for each optical wavelength arriving at each input of the optical routing matrix, a corresponding output of the optical routing matrix to which the optical wavelength is transmitted; and
  transmit an instruction to a first node of the plurality of nodes that, when executed by the first node, causes the first node to transmit data during a time slot, the data destined for a second node of the plurality of nodes, and the data transmitted to the optical coupler of the plurality of optical couplers to which the first node is optically connected; the data transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers;
 wherein the controller is further to:
  reconfigure the optical routing matrix for subsequent communication during a subsequent time slot;
  wherein the controller is to reconfigure the optical routing matrix to change, for a particular optical wavelength arriving at a particular input of the optical routing matrix, a corresponding output of the optical routing matrix to which the particular optical wavelength is transmitted; and
  wherein after reconfiguration the first node is unable to transmit data to the second node.

2. The optical switching system of claim 1, wherein the optical routing matrix is configured such that no optical signals of the same wavelength are transmitted to the same output of the optical routing matrix.

3. The optical switching system of claim 1, wherein the controller is further to:
 instruct a subset of the plurality of nodes to transmit data, through the optical routing matrix, when the optical routing matrix is being reconfigured, the subset of the plurality of nodes instructed to transmit data using optical wavelengths different from the particular optical wavelength.

4. The optical switching system of claim 1, wherein the optical routing matrix comprises at least one wavelength selective switch (WSS).

5. The optical switching system of claim 4, wherein the optical routing matrix comprises:
 a plurality of optical splitters, each optical splitter of the optical splitters having an input and a plurality of outputs;
 a plurality of WSS's, each WSS of the WSS's having an output and a plurality of inputs;
 wherein for each optical splitter of the optical splitters: the input of the optical splitter is optically connected to the output of a respective one of the optical couplers, and each output of the optical splitter is optically connected to a respective input of a different one of the WSS's;
 wherein for each WSS of the plurality of WSS's: each input of the WSS is optically connected to a respective output of a different one of the optical splitters, and the output of the WSS is optically connected to the input of a respective one of the wavelength demultiplexers.

6. The optical switching system of claim 1, wherein, for each node of the plurality of nodes, including the first node, the controller is to:
 transmit an instruction to the node that, when executed by the node, causes the node to transmit data during the time slot, the data destined for another node, and the data transmitted to an optical coupler of the plurality of optical couplers to which the node is optically connected; the data transmitted using an optical signal having an optical wavelength that is: (i) different from an optical wavelength of any other optical signal transmitted, during the time slot, by any other node connected to the optical coupler to which the node is optically connected, and (ii) the same as the optical wavelength of another optical signal transmitted by a different node, during the time slot, connected to another optical coupler of the plurality of optical couplers.

7. A method performed by a controller, the method comprising:
 communicating with an optical routing matrix and a plurality of nodes, wherein: the optical routing matrix is interposed between a plurality of optical couplers and a plurality of wavelength demultiplexers; the optical routing matrix is to transmit optical signals between the optical couplers and the wavelength demultiplexers; each one of the optical couplers has an output and a plurality of inputs, and each input of the plurality of inputs is for optical connection to a respective one of the plurality of nodes; each one of the wavelength demultiplexers has an input and a plurality of outputs, and each output of the plurality of outputs is also for optical connection to a respective one of the plurality of nodes; the optical routing matrix has a plurality of inputs and a plurality of outputs, and each input of the optical routing matrix is optically connected to the output of a respective one of the optical couplers, and each output of the optical routing matrix is optically connected to the input of a respective one of the wavelength demultiplexers;

configuring the optical routing matrix to set, for each optical wavelength arriving at each input of the optical routing matrix, a corresponding output of the optical routing matrix to which the optical wavelength is transmitted; and transmitting an instruction to a first node of the plurality of nodes that, when executed by the first node, causes the first node to transmit data during a time slot, the data destined for a second node of the plurality of nodes, and the data transmitted to the optical coupler of the plurality of optical couplers to which the first node is optically connected; the data transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers;

wherein the method further comprises, prior to the time slot:
receiving from the first node a message indicating how much data the first node has to transmit to each one of other nodes of the plurality of nodes, the other nodes including the second node; and
generating the instruction based on the message and the configuration of the optical routing matrix.

8. An optical switching system for switching data between a plurality of nodes, the optical switching system comprising:

a plurality of optical couplers, each one of the optical couplers having an output and a plurality of inputs; each input of the plurality of inputs for optical connection to a respective one of the plurality of nodes;

a plurality of wavelength demultiplexers, each one of the wavelength demultiplexers having an input and a plurality of outputs, each output of the plurality of outputs also for optical connection to a respective one of the plurality of nodes;

an optical routing matrix interposed between the optical couplers and the wavelength demulitplexers, the optical routing matrix to transmit optical signals between the optical couplers and the wavelength demulitplexers;

the optical routing matrix having a plurality of inputs and a plurality of outputs; each input of the optical routing matrix optically connected to the output of a respective one of the optical couplers, and each output of the optical routing matrix optically connected to the input of a respective one of the wavelength demultiplexers;

a controller to:
configure the optical routing matrix to set, for each optical wavelength arriving at each input of the optical routing matrix, a corresponding output of the optical routing matrix to which the optical wavelength is transmitted; and transmit an instruction to a first node of the plurality of nodes that, when executed by the first node, causes the first node to transmit data during a time slot, the data destined for a second node of the plurality of nodes, and the data transmitted to the optical coupler of the plurality of optical couplers to which the first node is optically connected; the data transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers;

wherein prior to the time slot, the controller is further to:
receive from the first node a message indicating how much data the first node has to transmit to each one of other nodes of the plurality of nodes, the other nodes including the second node; and
generate the instruction based on the message and the configuration of the optical routing matrix.

9. A method performed by a controller, the method comprising:

communicating with an optical routing matrix and a plurality of nodes, wherein: the optical routing matrix is interposed between a plurality of optical couplers and a plurality of wavelength demultiplexers; the optical routing matrix is to transmit optical signals between the optical couplers and the wavelength demultiplexers; each one of the optical couplers has an output and a plurality of inputs, and each input of the plurality of inputs is for optical connection to a respective one of the plurality of nodes; each one of the wavelength demultiplexers has an input and a plurality of outputs, and each output of the plurality of outputs is also for optical connection to a respective one of the plurality of nodes; the optical routing matrix has a plurality of inputs and a plurality of outputs, and each input of the optical routing matrix is optically connected to the output of a respective one of the optical couplers, and each output of the optical routing matrix is optically connected to the input of a respective one of the wavelength demultiplexers;

configuring the optical routing matrix to set, for each optical wavelength arriving at each input of the optical routing matrix, a corresponding output of the optical routing matrix to which the optical wavelength is transmitted; and transmitting an instruction to a first node of the plurality of nodes that, when executed by the first node, causes the first node to transmit data during a time slot, the data destined for a second node of the plurality of nodes, and the data transmitted to the optical coupler of the plurality of optical couplers to which the first node is optically connected; the data transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers;

wherein the method further comprises:
reconfiguring the optical routing matrix for subsequent communication during a subsequent time slot;
wherein the reconfiguring the optical routing matrix comprises changing, for a particular optical wavelength arriving at a particular input of the optical routing matrix, a corresponding output of the optical routing matrix to which the particular optical wavelength is transmitted; and wherein after reconfiguration the first node is unable to transmit data to the second node.

10. The method of claim 9, further comprising:
instructing a subset of the plurality of nodes to transmit data, through the optical routing matrix, when the optical routing matrix is being reconfigured, the subset of the plurality of nodes instructed to transmit data using optical wavelengths different from the particular optical wavelength.

11. The method of claim 7, wherein the optical routing matrix is configured such that no optical signals of the same wavelength are transmitted to the same output of the optical routing matrix.

12. The method of claim 7, further comprising:
also generating the instruction based on which optical wavelengths are to be used during the time slot by other nodes connected to the optical coupler to which the first node is optically connected.

13. The method claim 7, further comprising, for each node of the plurality of nodes including the first node:
transmitting an instruction to the node that, when executed by the node, causes the node to transmit data during the time slot, the data destined for another node, and the data transmitted to an optical coupler of the plurality of optical couplers to which the node is optically connected; the data transmitted using an optical signal having an optical wavelength that is: (i) different from an optical wavelength of any other optical signal transmitted, during the time slot, by any other node connected to the optical coupler to which the node is optically connected, and (ii) the same as the optical wavelength of another optical signal transmitted by a different node, during the time slot, connected to another optical coupler of the plurality of optical couplers.

14. The method of claim 7, wherein the optical routing matrix comprises at least one wavelength selective switch (WSS).

15. A controller comprising:
a scheduler to communicate with a plurality of nodes and
a routing matrix configurator to configure an optical routing matrix, wherein: the optical routing matrix is interposed between a plurality of optical couplers and a plurality of wavelength demultiplexers; the optical routing matrix is to transmit optical signals between the optical couplers and the wavelength demultiplexers; each one of the optical couplers has an output and a plurality of inputs, and each input of the plurality of inputs is for optical connection to a respective one of the plurality of nodes; each one of the wavelength demultiplexers has an input and a plurality of outputs, and each output of the plurality of outputs is also for optical connection to a respective one of the plurality of nodes; the optical routing matrix has a plurality of inputs and a plurality of outputs, and each input of the optical routing matrix is optically connected to the output of a respective one of the optical couplers, and each output of the optical routing matrix is optically connected to the input of a respective one of the wavelength demultiplexers;
the routing matrix configurator is to configure the optical routing matrix by setting, for each optical wavelength arriving at each input of the optical routing matrix, a corresponding output of the optical routing matrix to which the optical wavelength is transmitted; and the scheduler is to transmit an instruction to a first node of the plurality of nodes that, when executed by the first node, causes the first node to transmit data during a time slot, the data destined for a second node of the plurality of nodes, and the data transmitted to the optical coupler of the plurality of optical couplers to which the first node is optically connected; the data transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers;

wherein the routing matrix configurator is further to:
reconfigure the optical routing matrix for subsequent communication during a subsequent time slot;
wherein the reconfiguring the optical routing matrix comprises changing, for a particular optical wavelength arriving at a particular input of the optical routing matrix, a corresponding output of the optical routing matrix to which the particular optical wavelength is transmitted; and
wherein after reconfiguration the first node is unable to transmit data to the second node.

16. The controller of claim 15, wherein the optical routing matrix is configured such that no optical signals of the same wavelength are transmitted to the same output of the optical routing matrix.

17. The controller of claim 15, wherein the scheduler is further to:
instruct a subset of the plurality of nodes to transmit data, through the optical routing matrix, when the optical routing matrix is being reconfigured, the subset of the plurality of nodes instructed to transmit data using optical wavelengths different from the particular optical wavelength.

18. The controller of claim 15, wherein the scheduler is further to, for each node of the plurality of nodes, including the first node:
transmit an instruction to the node that, when executed by the node, causes the node to transmit data during the time slot, the data destined for another node, and the data transmitted to an optical coupler of the plurality of optical couplers to which the node is optically connected; the data transmitted using an optical signal having an optical wavelength that is: (i) different from an optical wavelength of any other optical signal transmitted, during the time slot, by any other node connected to the optical coupler to which the node is optically connected, and (ii) the same as the optical wavelength of another optical signal transmitted by a different node, during the time slot, connected to another optical coupler of the plurality of optical couplers.

19. The controller of claim 15, wherein the optical routing matrix comprises at least one wavelength selective switch (WSS).

20. A controller comprising:
a scheduler to communicate with a plurality of nodes and
a routing matrix configurator to configure an optical routing matrix, wherein: the optical routing matrix is interposed between a plurality of optical couplers and a plurality of wavelength demultiplexers; the optical routing matrix is to transmit optical signals between the optical couplers and the wavelength demultiplexers; each one of the optical couplers has an output and a plurality of inputs, and each input of the plurality of inputs is for optical connection to a respective one of the plurality of nodes; each one of the wavelength demultiplexers has an input and a plurality of outputs, and each output of the plurality of outputs is also for optical connection to a respective one of the plurality of nodes; the optical routing matrix has a plurality of inputs and a plurality of outputs, and each input of the optical routing matrix is optically connected to the output of a respective one of the optical couplers, and each output of the optical routing matrix is optically connected to the input of a respective one of the wavelength demultiplexers;

the routing matrix configurator is to configure the optical routing matrix by setting, for each optical wavelength arriving at each input of the optical routing matrix, a corresponding output of the optical routing matrix to which the optical wavelength is transmitted; and the scheduler is to transmit an instruction to a first node of the plurality of nodes that, when executed by the first node, causes the first node to transmit data during a time slot, the data destined for a second node of the plurality of nodes, and the data transmitted to the optical coupler of the plurality of optical couplers to which the first node is optically connected: the data transmitted using an optical signal having an optical wavelength that is: (i) different from an optical wavelength of any other optical signal transmitted, during the time slot, by any other node connected to the optical coupler to which the first node is optically connected, and (ii) the same as the optical wavelength of another optical signal transmitted by a different node, during the time slot, connected to another optical coupler of the plurality of optical couplers;

wherein the scheduler is further to, prior to the time slot:
receive from the first node a message indicating how much data the first node has to transmit to each one of other nodes of the plurality of nodes, the other nodes including the second node; and
generate the instruction based on the message and the configuration of the optical routing matrix.

21. The controller of claim 20, wherein the scheduler is further to:
also generate the instruction based on which optical wavelengths are to be used during the time slot by other nodes connected to the optical coupler to which the first node is optically connected.

* * * * *